United States Patent
Mannava et al.

(10) Patent No.: US 10,223,002 B2
(45) Date of Patent: Mar. 5, 2019

(54) COMPARE-AND-SWAP TRANSACTION

(71) Applicant: ARM Limited, Cambridge (GB)

(72) Inventors: Phanindra Kumar Mannava, Austin, TX (US); Bruce James Mathewson, Papworth Everard (GB); Klas Magnus Bruce, Leander, TX (US); Geoffray Matthieu Lacourba, Nice (FR)

(73) Assignee: ARM Limited, Cambridge (GB)

( * ) Notice: Subject to any disclaimer, the term of this patent is extended or adjusted under 35 U.S.C. 154(b) by 30 days.

(21) Appl. No.: 15/427,335

(22) Filed: Feb. 8, 2017

(65) Prior Publication Data

US 2018/0225047 A1    Aug. 9, 2018

(51) Int. Cl.
  *G06F 3/06* (2006.01)
  *G06F 12/06* (2006.01)
  *G06F 9/52* (2006.01)

(52) U.S. Cl.
  CPC .......... *G06F 3/0611* (2013.01); *G06F 3/0647* (2013.01); *G06F 3/0683* (2013.01); *G06F 9/52* (2013.01); *G06F 9/526* (2013.01); *G06F 12/06* (2013.01); *G06F 2212/1024* (2013.01)

(58) Field of Classification Search
  CPC ............... G06F 9/3004; G06F 9/30043; G06F 9/30087; G06F 9/30072; G06F 9/524; G06F 9/526; G06F 12/0842; G06F 12/145; G06F 12/14; G06F 12/0804; G06F 2212/1052; G06F 2209/521; G06F 3/0611; G06F 3/0647; G06F 3/0683; G06F 12/06; G06F 9/52; G06F 2212/1024
See application file for complete search history.

(56) References Cited

U.S. PATENT DOCUMENTS

| | | | |
|---|---|---|---|
| 5,889,983 A | 3/1999 | Mittal et al. | |
| 6,480,845 B1 | 11/2002 | Egolf et al. | |
| 2003/0182515 A1 | 9/2003 | Zahir | |
| 2011/0010522 A1* | 1/2011 | Abts | G06F 15/17375 712/3 |
| 2014/0281196 A1* | 9/2014 | Dixon | G06F 12/14 711/105 |
| 2017/0064051 A1* | 3/2017 | Steinmacher-Burow | H04L 45/74 |

OTHER PUBLICATIONS

International Search Report and Written Opinion of the International Searching Authority dated Mar. 26, 2018 in PCT/GB2017/053827, 13 pages.
"Atomic Operations", *PCI-SIG Engineering Change Notice*, Apr. 17, 2008, 26 pages.

* cited by examiner

*Primary Examiner* — Hiep T Nguyen
(74) *Attorney, Agent, or Firm* — Nixon & Vanderhye P.C.

(57) ABSTRACT

A compare and swap transaction can be issued by a master device to request a processing unit to select whether to write a swap data value to a storage location corresponding to a target address in dependence on whether a compare data value matches a target data value read from the storage location. The compare and swap data values are transported within a data field of the compare and swap transaction. The compare data value is packed into a first region of the data field in dependence of an offset portion of the target address and having a position within the data field corresponding to the position of the target data value within the storage location. This reduces latency and circuitry required at the processing unit for handling the compare and swap transaction.

17 Claims, 8 Drawing Sheets

Compare (C) and Swap (S) values: 2 byte each
Data size 2 byte
Data aligned to Data size boundary
Data (D) value in non-compare and swap: 2 byte Option 2: S data value at the addressed location
Option 3: C at the lower address location
Option 4: S data value at the lower address location
Option 5: C and S data are included in different data flits S and C data value size is 1 byte

COMPARE-AND-SWAP TRANSACTION

BACKGROUND

Technical Field

The present technique relates to the field of data processing.

Technical Background

A data processing apparatus may support a compare-and-swap transaction which triggers a read of a data value from a storage location in a memory or cache, a comparison of the read data value with a compare data value and, if the compare data value matches the target data value, a write of the swap data value to the storage location. This can be useful for example where different processes have access to shared resources. For example, the location targeted by the compare-and-swap transaction may store a lock variable which governs whether a process has access to the shared data. The compare-and-swap transaction may perform the comparison of the lock variable with a given value to check whether the lock is currently set by another process, and if the lock is not currently set, write a swap data value to the storage location in order to claim the lock. Subsequent processing using a shared resource can then be dependent on the compare-and-swap transaction executing successfully to claim the lock.

SUMMARY

At least some examples provide an apparatus comprising:
a master device to issue transactions specifying a target address and comprising a data field for transporting at least one operand value, wherein the master device is configured to issue a compare-and-swap transaction for which said at least one operand value comprises a compare data value and a swap data value; and
a processing unit responsive to the compare-and-swap transaction to select whether to write the swap data value to a storage location corresponding to the target address in dependence on whether the compare data value matches a target data value read from the storage location, an offset portion of the target address indicating the position of the target data value within the storage location;
wherein when issuing the compare-and-swap transaction, the master device is configured to pack the compare data value into a first region of said data field selected in dependence on said offset portion of the target address and having a position within said data field corresponding to the position of the target data value within the storage location.

At least some examples provide a master device comprising:
transaction issuing circuitry to issue transactions specifying a target address and comprising a data field for transporting at least one operand value;
wherein the transaction issuing circuitry is configured to issue a compare-and-swap transaction for which said at least one operand value comprises a compare data value and a swap data value, the compare-and-swap transaction for controlling a processing unit to select whether to write the swap data value to a storage location corresponding to the target address in dependence on whether the compare data value matches a target data value read from the storage location, an offset portion of the target address indicating the position of the target data value within the storage location;
wherein when issuing the compare-and-swap transaction, the transaction issuing circuitry is configured to pack the compare data value into a first region of said data field selected in dependence on said offset portion of the target address and having a position within said data field corresponding to the position of the target data value within the storage location.

At least some examples provide a processing unit comprising:
transaction receiving circuitry to receive transactions specifying a target address and comprising a data field for transporting at least one operand value, wherein the transaction receiving circuitry is configured to receive a compare-and-swap transaction for which said at least one operand value comprises a compare data value and a swap data value;
data access circuitry responsive to the compare-and-swap transaction to read a storage location corresponding to the target address, an offset portion of the target address indicating the position of a target data value within the storage location; and
processing circuitry responsive to the compare-and-swap transaction to select whether the data access circuitry is to write the swap data value to said storage location in dependence on whether the compare data value matches the target data value;
wherein the processing circuitry is configured to locate the compare data value within a first region of said data field selected in dependence on said offset portion of the target address and having a position within said data field corresponding to the position of the target data value within the storage location.

At least some examples provide a data processing method comprising:
issuing a compare-and-swap transaction specifying a target address and comprising a data field for transporting a compare data value and a swap data value; and
in response to the compare-and-swap transaction, selecting whether to write the swap data value to a storage location corresponding to the target address in dependence on whether the compare data value matches a target data value read from the storage location, an offset portion of the target address indicating the position of the target data value within the storage location;
wherein in the compare-and-swap transaction, the compare data value is packed into a first region of said data field selected in dependence on said offset portion of the target address and having a position within said data field corresponding to the position of the target data value within the storage location.

Further aspects, features and advantages of the present technique will be apparent from the following description of examples, which is to be read in conjunction with the accompanying drawings.

DESCRIPTION OF EXAMPLES

Figure 1:
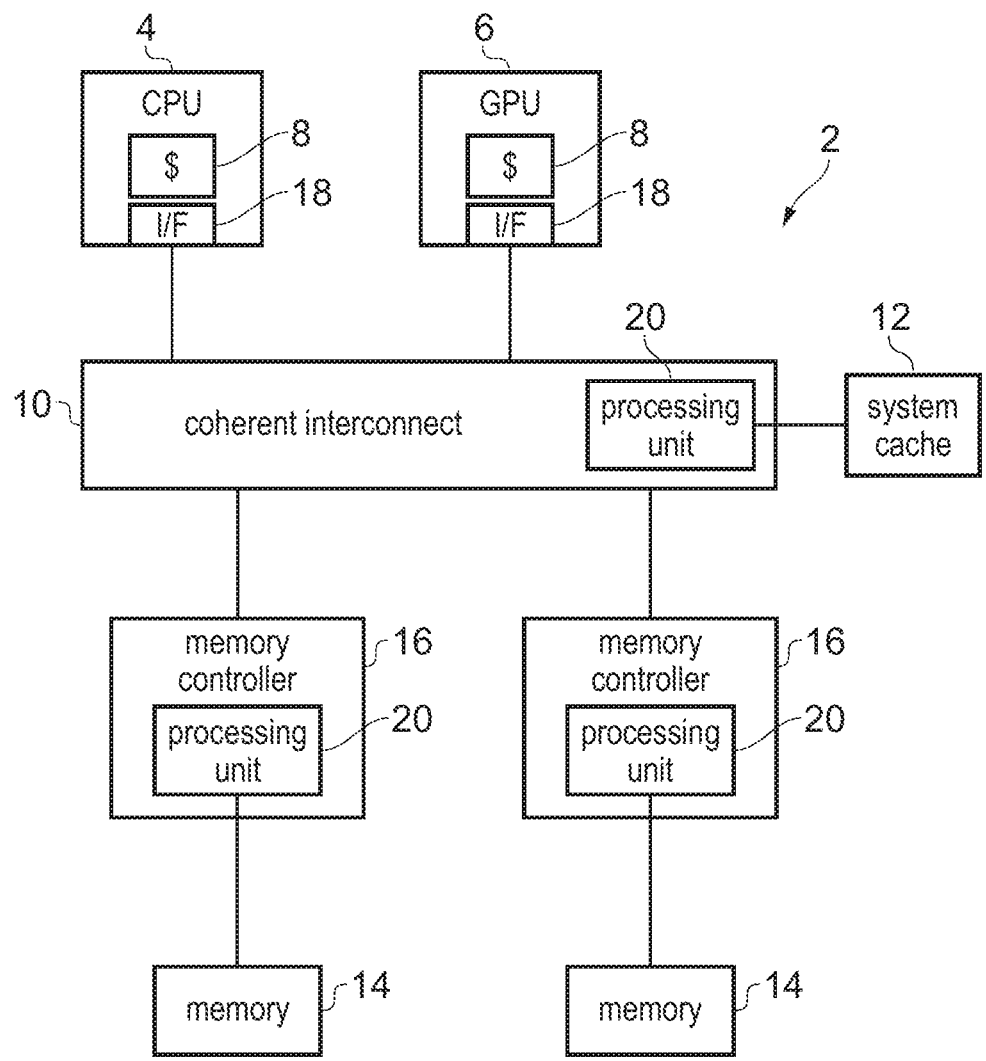
FIG. 1 illustrates an example of an apparatus supporting a compare-and-swap transaction.

A master device supports one or more types of transaction which specify a target address and comprise a data field for transporting at least one operand value. The transactions are processed by a processing unit. One type of transaction supported is a compare-and-swap transaction for which the data field transports at least two operands, including a compare data value and a swap data value. In response to the compare-and-swap transaction, the processing unit selects whether to write the swap data value to a storage location corresponding to the target address in dependence on whether the compare data value matches a target data value read from the storage location.

An offset portion of the target address identifies the position of the target data value within the storage location. When issuing the compare-and-swap transaction, the master device packs the compare data value into a first region of the data field which is selected in dependence on the offset portion, so that the first region has a position within the data field which corresponds to the position of the target data value within the storage location. By varying the position of the compare data value within the data field in dependence on the particular address being accessed, the compare data value is already aligned to the position of the target data value within the storage location and so there is no need for further shifting of the data field prior to performing the comparison between the compare data value and the target data value. This improves performance by allowing the compare operation to start more quickly, reducing the overall latency associated with performing the compare-and-swap transaction, and also helps to reduce the circuit overhead in the processing circuitry by eliminating the shifter.

The swap data value may be packed into a second region of the data field adjacent to the first region. Unlike other types of transaction specifying a single operand to be transported in the data field, for a compare-and-swap transaction there are at least two operands to be transported. One would normally expect that a transaction should be defined so that the operands are packed in a certain fixed order in the data field, to simplify encoding and decoding. However, the inventors recognised that encoding the compare data value and swap data value in the same order for each transaction would make it difficult to align the compare data value with the target data value while still maintaining data size alignment (processing systems can often process data more efficiently if a block of data of a given size is aligned to an address which is a multiple of that size).

Instead, the relative order of the compare data value and swap data value may be varied depending on the offset portion of the address. The first region and the second region may form a combined portion of the data field which starts at an offset within the data field which corresponds to a multiple of the size of the combined portion. When the target address is aligned with respect to a multiple of the combined size of the compare data and the swap data value, the swap data value may be packed into a second region which follows the first region in the data field. When the target address is misaligned with respect to a multiple of the combined size, the master device may pack the swap data value into a second region which precedes the first region in the data field. Hence, the ordering of the swap data value and the compare data value may vary depending on the particular address being accessed and its alignment with respect to a multiple of the combined size. While this may seem like complexity which would better be avoided (e.g. instead one could always place the swap data value before or after the compare data value), the variable-order encoding has the advantage that the compare data value is located in a position aligned with the location of the target data value in the storage location, while the overall block of data comprising the compare data value and the swap data value is still aligned to the data size boundary. Aligning the operand block to a data size boundary can help improve the efficiency of handling the transaction, as for example buffers, multiplexers, processing logic etc. may handle data in chunks of a certain size and so may function more efficiently if the block containing the compare/swap data values corresponds to an aligned chunk.

The processing unit may have an arithmetic logic unit (ALU) to perform a compare operation on the compare data value extracted from the data field and the target data value read from the storage location. In the compare operation, the ALU may receive as one of its inputs an unshifted version of the data field of the compare-and-swap transaction. The encoding discussed above with the compare value aligned to the location of the target data value in a storage location means that a shift prior to the ALU is unnecessary and can be omitted to save time and reduce circuit overhead.

A shifter may still be provided in the processing unit for performing a shift operation to shift the data field to align the swap data value with the position of the target data value within the storage location. The shift operation for the swap value may be performed in parallel with the ALU performing the compare operation, so that the latency associated with shifting the swap data value is hidden. Since a result of the compare operation is needed before the processing unit can determine whether to write the shift swap data value to the storage location, the compare operation affects the overall processing latency more than the shift operation and so by encoding the data field of the transaction to favour reducing the latency associated with the compare operation, the overall latency of the compare-and-swap operation can be reduced.

The master device may also support at least one other type of transaction, for which the data field is used to convey a single operand value. The other type of transaction may trigger the processing unit to update the storage location with a value dependent on at least the single operand data value. For some forms of transaction the value written to the storage location could also depend on the value read from the storage location. For example, the processing unit may generate the new value by performing an arithmetic/logical operation on the transported operand and the previous value of the storage location (e.g. adding or subtracting the values, or combining them with a logical operation such as AND, OR, etc.).

For the at least one other type of transaction, the single operand data value may be packed into the same first region of the data field selected based on the offset portion of the address that would be used for transporting the compare data value of a compare and swap operation. Hence, by using this first region to transport the single operand, the operand is aligned to the location of the target value within the storage location, which simplifies further processing. Hence, the encoding of the single-operand transactions and compare-and-swap transaction is such that the ALU can use the same mapping between the data field of a received transaction and one of the ALU's inputs, regardless of whether the received transaction is one of the single-operand transactions or the compare-and-swap transaction. By using the same input operand mapping for the ALU regardless of the transaction type, this eliminates the need for additional multiplexing logic to select between different options for inputting to the ALU, which reduces the amount of circuitry at the processing unit and reduces latency.

The transactions having the data field as discussed above may comprise atomic transactions for controlling the processing unit to perform an indivisibly observed set of operations on the data in the storage location. Atomic transactions can be particularly useful in cases where multiple processes share access to shared data. For example, the logic associated with a cache/memory may enforce the atomicity by preventing other accesses to the same address being processed until all the operations associated with the atomic transaction are complete. Making the transaction atomic helps to prevent errors caused by inappropriately timed accesses from multiple processes. For example, with a compare-and-swap operation associated with setting of a lock variable, if this was implemented as separate non-atomic read, compare and write operations, a second process could attempt to claim the lock after a first process has read the lock variable but before the first process has written the lock variable to claim the lock, and so the read triggered by the second process could detect that the lock is still unclaimed, leading to the second process writing the lock to claim the lock itself. Hence, this could lead to both the first and second processes believing they hold the lock, which could cause errors due to simultaneous access to an associated shared resource controlled by the lock. By making the transaction atomic, such errors can be avoided as it is not possible for the second process's transaction to succeed if the first process started its transaction first. The processes sharing access to the shared data could be processes executing on different master devices of the system, or processes executing on the same device (e.g. different virtual machines running on the same hardware device, or different threads in a multi-threading environment).

The processing unit for processing the transactions could be processing circuitry within the master device itself. However, performance can be improved by using a processing unit which lies closer to the memory or cache in which the target data is stored. For example, the processing unit could be provided within an interconnect for maintaining coherency between the master device and at least one other master device or cache, or within a memory controller for controlling access to a memory. By performing atomic transactions closer to the cache or memory, not only is the latency associated with the transaction reduced by avoiding delays caused by reading the data value out to a master device, performing an ALU operation in the master device and then writing the result back to memory, but also for atomic transactions it is simpler to enforce the atomicity of the transactions.

FIG. 1 schematically illustrates an example of a data processing apparatus 2 which includes a number of master devices 4, 6 which share access to a memory system. In this example the master devices include a central processing unit (CPU) 4 and a graphics processing unit (GPU) 6 but it will be appreciated that other types of master device could also be provided, e.g. a network interface controller or a display controller for example. The CPU 4 and GPU 6 each have at least one cache 8 for caching data from a memory system. The memory system is accessed via a coherent interconnect 10 which manages coherency between the respective caches 8 in the master devices 4, 6 and any other caches in the system (e.g. a system level cache 12 coupled to the interconnect which is not assigned to any particular master). When accessing data in its local cache 8, a master device 4, 6 may send a coherency transaction to the coherent interconnect 10. In response to the transaction, the interconnect 10 transmits snoop requests to other caches if it is determined that those caches could be holding data from the corresponding address, to locate the most up to date copy of the required data and trigger invalidations of out-of-date data or write backs of modified data to memory if required, depending on the requirements of the coherency protocol being adopted. If data needs to be fetched from main memory 14, the coherent interconnect 10 may trigger read requests to the memory 14 via one or memory controllers 16, and similarly write to main memory may be triggered by the coherent interconnect 10. The master devices each have a transaction interface 18 responsible for generating the transactions sent to the interconnect 10 and receiving the responses from the interconnect, as well as handling snoop requests triggered by the interconnect in response to transactions issued by other masters. The interface 18 can be seen as transaction issuing circuitry for generating transactions.

Figure 2:
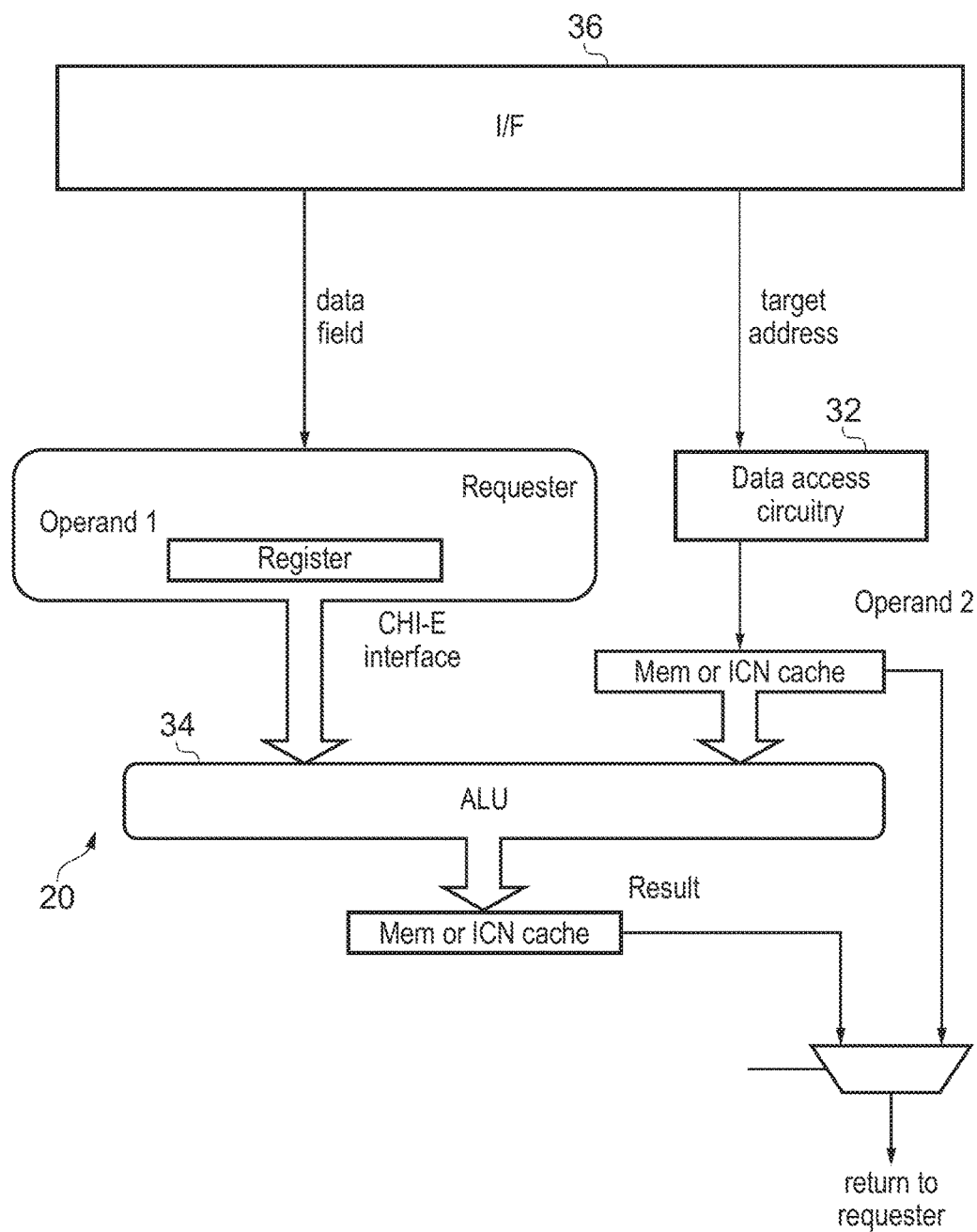
FIG. 2 schematically illustrates an example of processing an atomic transaction.

In addition to regular read or write transactions of the coherency protocol which may cause data to be read into the cache 8 or written to memory, the system may also support atomic transactions which are processed by a processing unit 20 lying closer to the location of the stored data. As shown in FIG. 2, in general the atomic transactions involve data access circuitry 32 reading a value from a storage location in a cache 12 or memory 14 identified by a target address, an arithmetic/logic unit (ALU) 34 performing an arithmetic or logical operation on the read data value and an operand provided by the requesting master device (although the ALU can be bypassed for the atomic swap operation described below), and the data access circuitry 32 writing a result value back to the addressed storage location. Either the old value stored in the storage location before performing the atomic transaction, or the new value generated by the ALU 34 in response to the atomic transaction, is also returned to the requesting master device. The read, ALU operation and write take place atomically, so that they are processed as an indivisible series of operations which cannot be partially completed or interleaved with other operations performed on the memory or cache.

For example, the following types of atomic transactions can be supported by the processing unit 20:

| Atomic transaction type | operands | Result |
| --- | --- | --- |
| Atomic Load | AddrLoc; TxnData | [AddrLoc] op TxnData -> [AddrLoc] read storage location, perform ALU operation on previous value of storage location and the operand provided by the transaction, write the result to the storage location, and return the old value of the storage location to the requester |
| Atomic Store | AddrLoc; TxnData | [AddrLoc] op TxnData -> [AddrLoc] read storage location, perform ALU operation on previous value of storage location and the operand provided by the transaction, write the result to the storage location, and return the result of the ALU operation to the requester |
| Atomic Swap | TxnData | TxnData -> [AddrLoc] read storage location, write operand provided by the transaction to the storage location, return the old value of the storage location to the requester (note the ALU operation is omitted for Atomic Swap) |
| AtomicCompare | AddrLoc; CompareData; SwapData | If([AddrLoc] == Cdata) then write Sdata in AddrLoc. Return the old value of the requester or a value indicating whether the compare identified a match. |

When the target data of the atomic transaction is stored in the system cache 12, the transaction may be processed using a processing unit 20 within the interconnect. When the target data is stored in main memory 14, the atomic transaction may be processed by a processing unit 20 within the corresponding memory controller 16. It will be appreciated that the processing unit 20 for processing atomic transactions could also be located elsewhere in the system 2.

Figure 3:
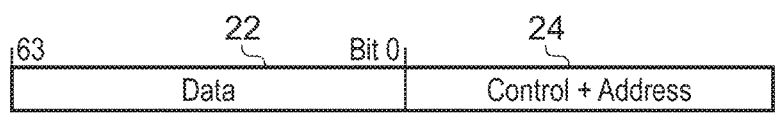
FIG. 3 shows an example encoding of an atomic transaction.

Hence, each atomic transaction may require either one or two operands to be transported from the master device to the processing unit 20 across the interconnect 10. For the atomic load, store and swap operations there is a single operand to be transported, but for the atomic compare operation there are two operands to be transported: the compare data value and the swap data value. As shown in FIG. 3, a transaction may include a data field 22 for transporting the one or two operands, and a control field 24 providing a target address of the storage location to be accessed and any other control information such as information specifying the type of the atomic operation to be performed or specifying the type of ALU operation for atomic load/store transactions (e.g. the ALU operation could be selected from a range of applications, e.g. one of add, subtract, multiply, AND, OR, NAND, NOR, XOR, etc.).

Figure 4:
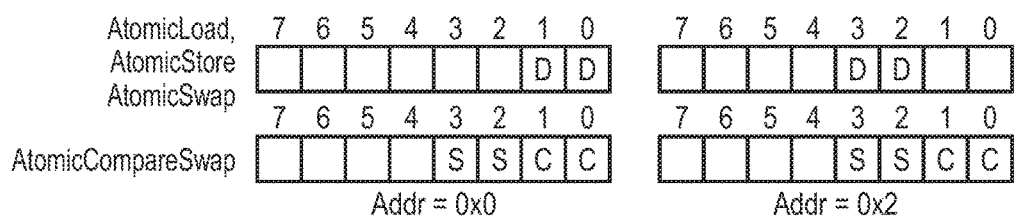
FIG. 4 shows for comparison an alternative way of packing a data field of an atomic transaction.

The packing of the operand values into the data field affects the complexity of the logic for performing the atomic operation at the processing unit 20. FIG. 4 shows a comparative example showing an alternative way of packing the data field. The system may support the atomic operations processing values of different sizes, for example the operand values can be 1 byte, 2 bytes or 4 byte values for example. On the other hand, the read to the cache or memory may return an entire cache line of data which may have a larger size (8 or 16 bytes for example). Hence, the target data value may be only located within a portion of the read cache line. To avoid needing to shift the data field before combining it with the data value read from the address storage location, for the non-compare atomic operations such as atomic load, atomic store and atomic swap, it can be useful to pack the single operand (D) into a region of the data field which is aligned to the position of the target data value within the address storage location. For example, in FIG. 4 when the address has an offset portion 0x0 indicating that the target data is starting at the least significant byte of the addressed location, the data value D may be located within a region starting at offset 0 in the data field. In the example shown in the right hand side of FIG. 4, when the address offset is 0x2 the data value D is aligned to an offset of 2 within the data field, so that no further shifting of the data field is required before combining it with the target value. Depending on the size of the operands being used, appropriate masking of the ALU can be performed in order to ensure that other portions of the storage location which do not contain the target data value are not overwritten with the result of the atomic operation.

However, for the atomic compare and swap operation, there are two data values to be transported, the compare value (C) and the swap value (S). In this case, at least one of the compare and swap data values cannot be located in the region of the data field which is aligned to the position of a target data value in the address storage location. To improve efficiency of handling of the transaction, it is generally desirable to align the block of data to be transported to a data size boundary which corresponds to a multiple of the combined size of the compare and swap data values. For example, in FIG. 4 the combined data size is 4 bytes and so it is preferable to place the combined block of operand data either starting at offset 0 or starting at offset 4, rather than misaligning the block with respect to the 4 byte data size boundary. FIG. 4 shows an example where the compare data is placed in the lower part of the operand block and the swap data is placed in the upper part, regardless of the particular address being accessed.

Figure 5:
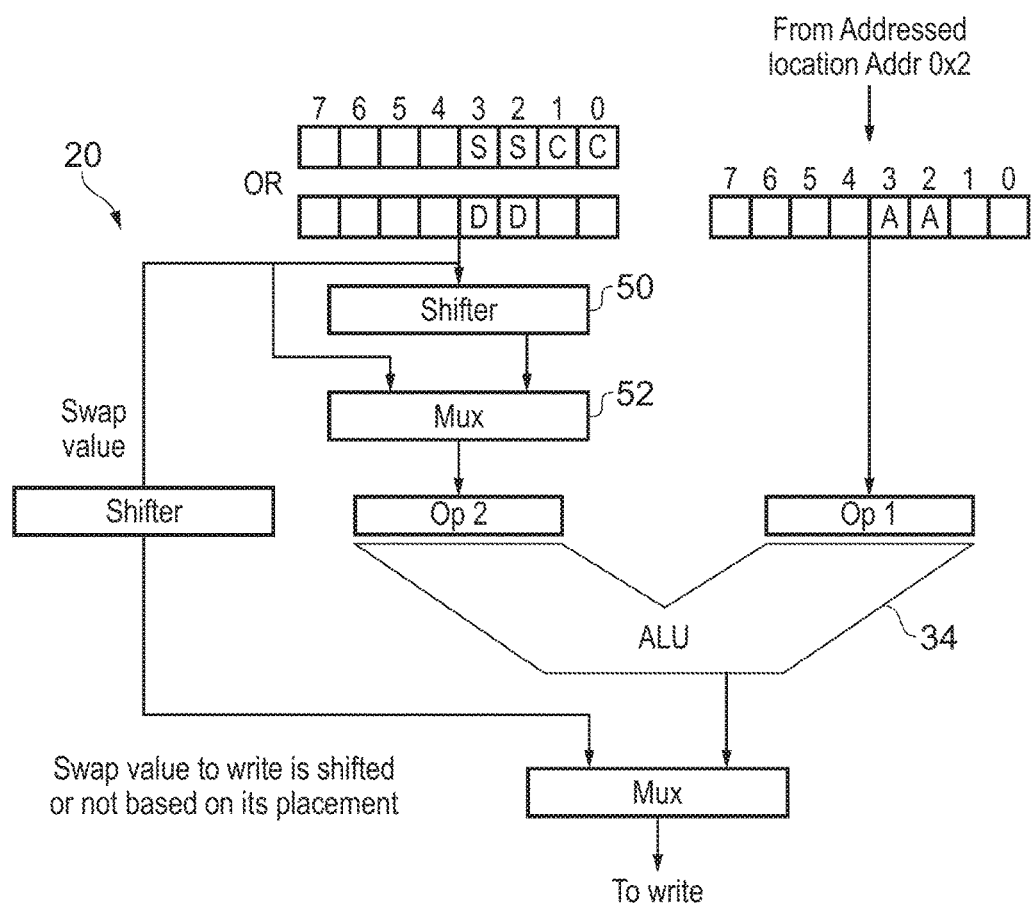
FIG. 5 shows an example of processing circuitry for processing the atomic transaction when encoded as shown in FIG. 4.

However, as shown in FIG. 5, when the data field is packed as shown in FIG. 4, a shifter 50 is required within the processing unit 20 to shift the compare value C to align it with the location of the target data value within the addressed storage location, before inputting the shifted value to the ALU 34. Also, since the non-compare-and-swap transactions do not require the shift as the data value D is already aligned to the target data A, a multiplexer 52 is provided to select between the shifted and non-shifted versions of the data field when supplying the second operand to the ALU 34. The shifter 50 and multiplexer 52 require additional circuitry and also increase the latency associated with the operation since the compare operation cannot start until the result of the shift is available.

Figure 6:
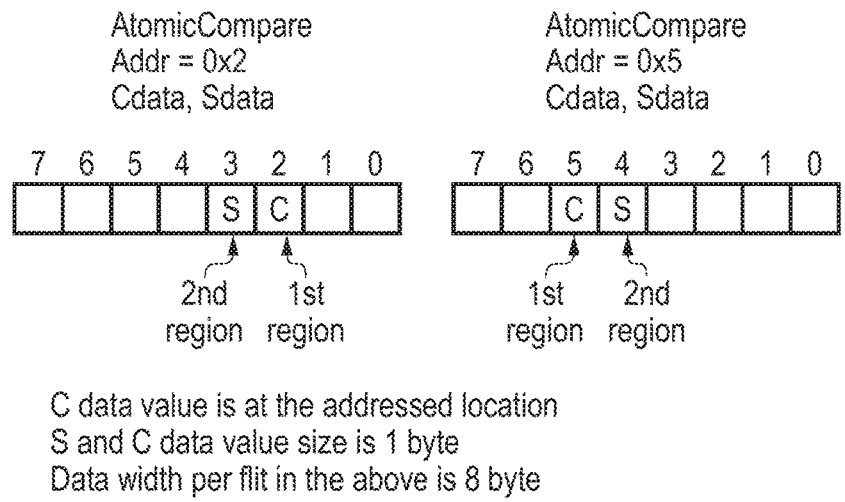
FIG. 6 shows an example of encoding a compare-and-swap transaction so that the compare data value packed into a region of a data field which corresponds to the position of the target data value in the storage location.

FIG. 6 shows an encoding of the data field in which the order of the compare and swap data values depends on the offset portion of the target address. In this example, the compare data value C is packed into a first region of the data field which is selected based on the offset portion of the target address and corresponds to the position of the address target data A within the storage location. The swap data is placed in the other half of the aligned block of operand data which is aligned to a data size boundary corresponding to the combined size of the swap and compare values.

Hence, if the target address is aligned to a data size boundary corresponding to that combined size, the compare data value will precede the swap data value in the data field with the compare data value being in a first region corresponding to a lower offset than the second region comprising the swap data value. For example, the left hand side of FIG. 6 shows an example where the combined size of the two operands is 2 bytes, and the address offset this case is 0x2 which is an exact multiple of the combined size. Therefore, the compare data C is at the lower location (offset 2) in the 2-byte aligned block which aligns to the offset portion of the target address, and the swap data S is in the upper location at offset 3.

On the other hand, as shown in the right hand part of FIG. 6 when the address offset is not an exact multiple of the combined data size, the second region comprising the swap data S precedes the first region comprising the compare data C. For example, for address offset 0x5 which is not a multiple of 2 bytes, the compare data C is packed into the upper part of the 2-byte aligned block at offset 5, and the swap data is placed in the other half of the aligned block at offset 4. Hence, the compare data C can still be aligned to the position of the target data within the address storage location, and the combined block of operand data is still aligned to the combined data size boundary.

Figure 7:
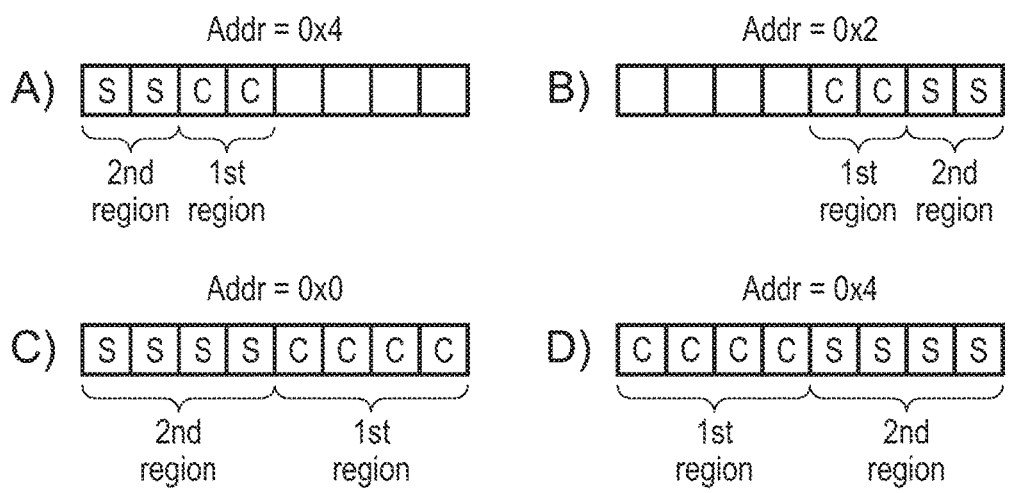
FIG. 7 shows further examples of the data field for different data sizes.

FIG. 7 shows further examples of packing of the data field for different sized operands. The examples A) and B) of FIG. 7 show cases where the operand size is 2 bytes and so the 4-byte combined block of operand data is aligned to a 4-byte boundary, i.e. placed at an offset of 0 or 4. When the address offset 0x0 is aligned to a 4-byte boundary as in example A), the compare data C is at offset 0 in the lower half of the block and the swap data S is at offset 2 in the upper half. In the example B) when the address offset 0x2 is misaligned with respect to the 4-byte data structure boundary, the compare data is in a first region in the upper half of the four byte block (at offset 2) and the swap data is in a second region in the lower half (at offset 0). Examples C) and D) show a similar example for four byte operands. While all the examples in FIGS. 6 and 7 show an example of an 8-byte field for comprising the data, it will be appreciated that this is not essential and other size data fields may be provided. Also, it is not required for the data field to be transmitted in a single flit within a transaction and in some examples the data field may be split into two or more flits (separate data transfers over a narrower bus) which combine form the overall packet representing the transaction.

Figure 8:
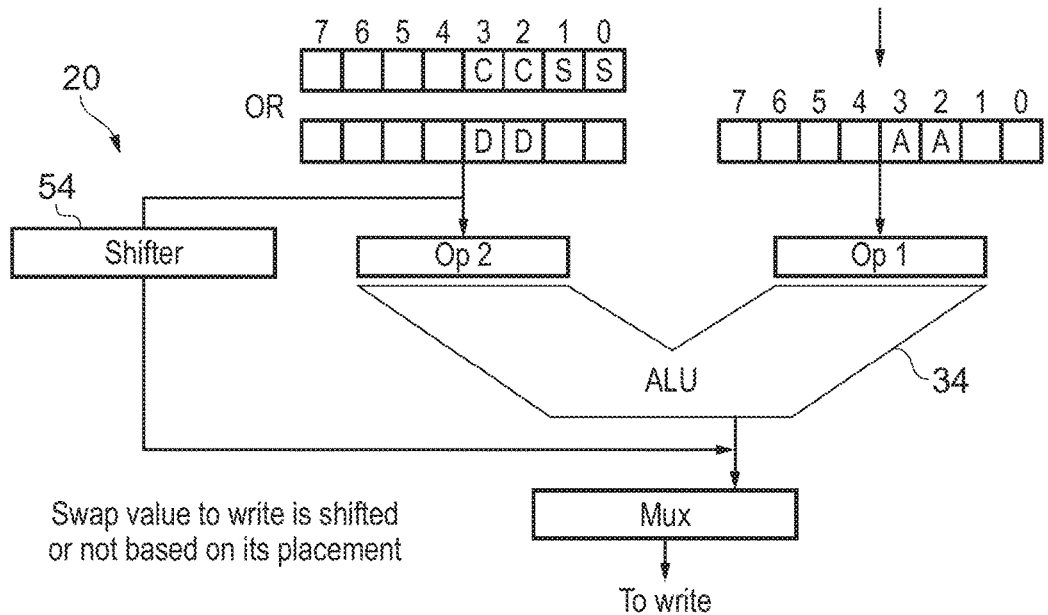
FIG. 8 shows an example of processing circuitry for processing the compare-and-swap transaction when encoded as shown in FIG. 6.

As shown in FIG. 8, when the swap and compare data for the compare and swap operation is packed in the way discussed in FIGS. 6 and 7, then this simplifies the processing unit 20 by eliminating the need for the shifter and multiplexer 50, 52 shown in FIG. 5. Since the compare data C is already aligned to the location of the target data A within the address storage location, there is no need for a shift before the ALU operation can start. Also, since the second operand to the ALU 34 is in the same region of the data field regardless of whether the operation is a compare and swap operation or another type of atomic operation, there is no need for the multiplexer 52 since the mapping between the data field and the second operand of the ALU is the same for all of the types of atomic transaction discussed above. That is, the operand that is fed into the ALU for both compare and swap operations and non-compare and swap atomic operations come from the same bytes of the data packet. While the swap data value S is not aligned to the target data value A, and so is subject to a shift operation performed by a shifter 54 within the processing unit 20, the latency associated with the shift operation 54 can be off the critical path, since the shift can be performed in parallel with the comparison performed by the ALU 34 when processing a compare and swap operation. Hence, this approach eliminates latency in handling the atomic operations in addition to reducing logic size. Note that the latency is reduced not only for the compare and swap operation but also for the other types of atomic operation since there is no need to traverse the multiplexer 52.

Figure 9:
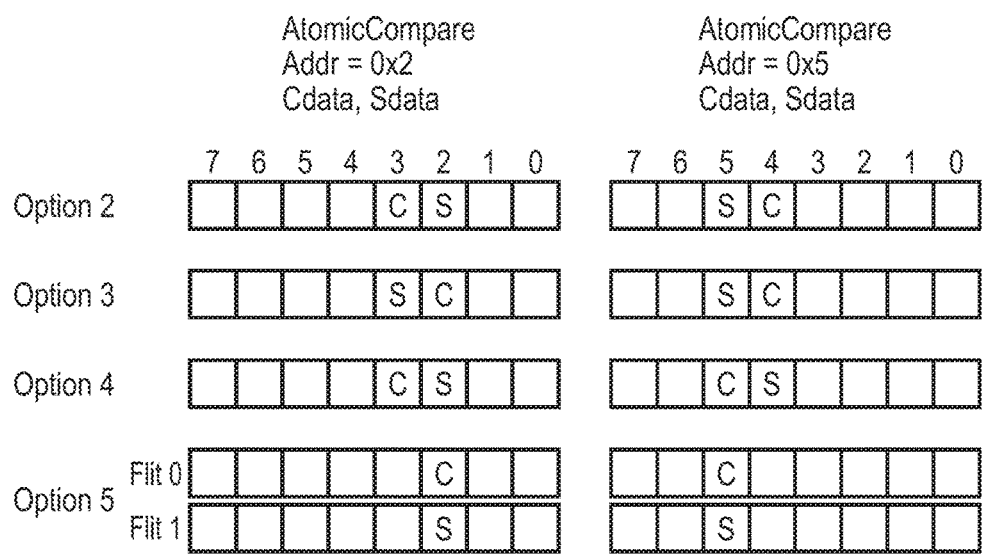
FIG. 9 shows for comparison a number of alternative options for encoding the data field.

For comparison, FIG. 9 shows a number of other ways in which the atomic compare and swap operation could be encoded within the data field while respecting the data alignment to a size boundary. Option 2 shows an example where the swap data is aligned to the addressed target data and the compare data is packed into the other half of the size aligned block. Option 3 shows an example where the compare data is placed in the lower address location of the size-aligned block regardless of the alignment of the target address with the combined-size-aligned address boundary. Option 4 shows an example where the swap data is placed at the lower address location regardless of the target address. Option 5 shows an example which would enable both the compare and swap data to be transmitted aligned to the location of the target data value A within the storage location, by transmitting the compare and swap data values in separate data flits.

The following table illustrates the different shifts required for the options shown in FIG. 9:

| Data value | Options | | | |
| --- | --- | --- | --- | --- |
| | Proposed | option 4 | option 3 | option 2 |
| Compare | A) No Shift<br>B) No Shift | A) No Shift<br>B) Shift right N Bytes | A) No Shift<br>B) Shift left N Bytes | A) Shift left N Bytes<br>B) Shift right N Bytes |
| Swap | A) Shift right N Bytes<br>B) Shift left N Bytes | A) No Shift<br>B) Shift left N Bytes | A) No Shift<br>B) Shift right N Bytes | A) No Shift<br>B) No Shift |

Case A) refers to the case when the target address is aligned to a size boundary corresponding to a combined size of the swap and compare values, and case B) refers to the case when the target address is misaligned with respect to the combined data size boundary. While it may seem that regardless of which option is chosen, there is still a need for an equivalent amount of shifting (either one or other of the compare value and swap value will need to be shifted), an advantage of the proposed approach shown in FIG. 6 is that no shifting is required for the compare operation, which enables the shifting latency to be hidden under the latency associated with the ALU performing the compare. In contrast, a shift to the compare value would have to be performed sequentially with the ALU operation. The proposed option allows the shifter 50 to be eliminated altogether. Also, the mapping between the data field 22 and the input to the ALU can be the same for both compare and swap operations and other types of atomic transactions, eliminating the multiplexer 52. While option 5 would not require any additional logic to compare and swap data values, it would have the disadvantage of using twice as much outbound data bandwidth for atomic compare transactions and may also require special handling by the interconnect 10 because the format of an atomic compare and swap transaction would be different to the other atomic transactions.

Figure 10:
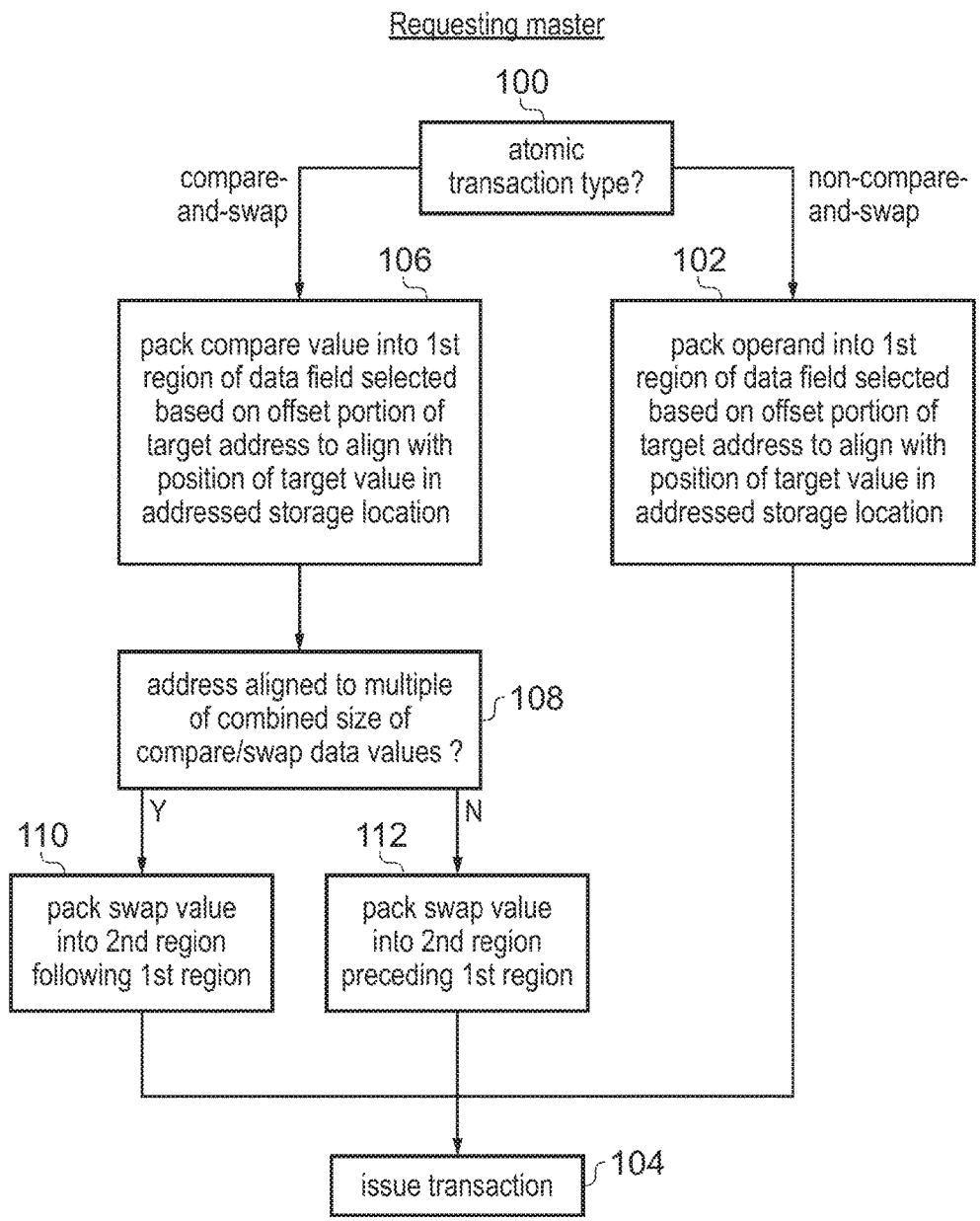
FIG. 10 is a flow diagram illustrating a method of generating an atomic transaction at a requesting master device.

FIG. 10 shows a method of generating an atomic transaction at a requesting master device 4, 6. At step 100 the type of atomic transaction to be generated is determined. If the transaction is a non-compare and swap transaction then at step 102 the operand of the transaction is packed into a first region of the data field which is selected based on the offset portion of the target address, so that the first region aligns with the position of the target value in the address storage location. At step 104 the transaction is then issued.

On the other hand, if the atomic transaction is a compare and swap transaction then at step 106 the compare value is packed into the first region of the data field selected in the same way as in step 102. At step 108 it is determined whether the target address is aligned to a multiple of the combined size of the compare and swap data values. If the address is aligned then at step 110 the swap data value is packed into a second region of the data field which follows the first region used for the compare value, while if the address is not aligned to a multiple of the combined data size then at step 112 the swap data value is packed into a second region which precedes the first region containing the compare data value. The effect of steps 108, 110 and 112 is that the overall block of operand data is data size aligned to the appropriate multiple of the combined data size, but the location of the compare data value varies in order to align it with the location of the target value within the address storage location with the swap value then filling the rest of the combined block of data. Again, at step 104 the transaction is then issued to the interconnect 10 by the transaction issuing interface 18 within the master.

Figure 11:
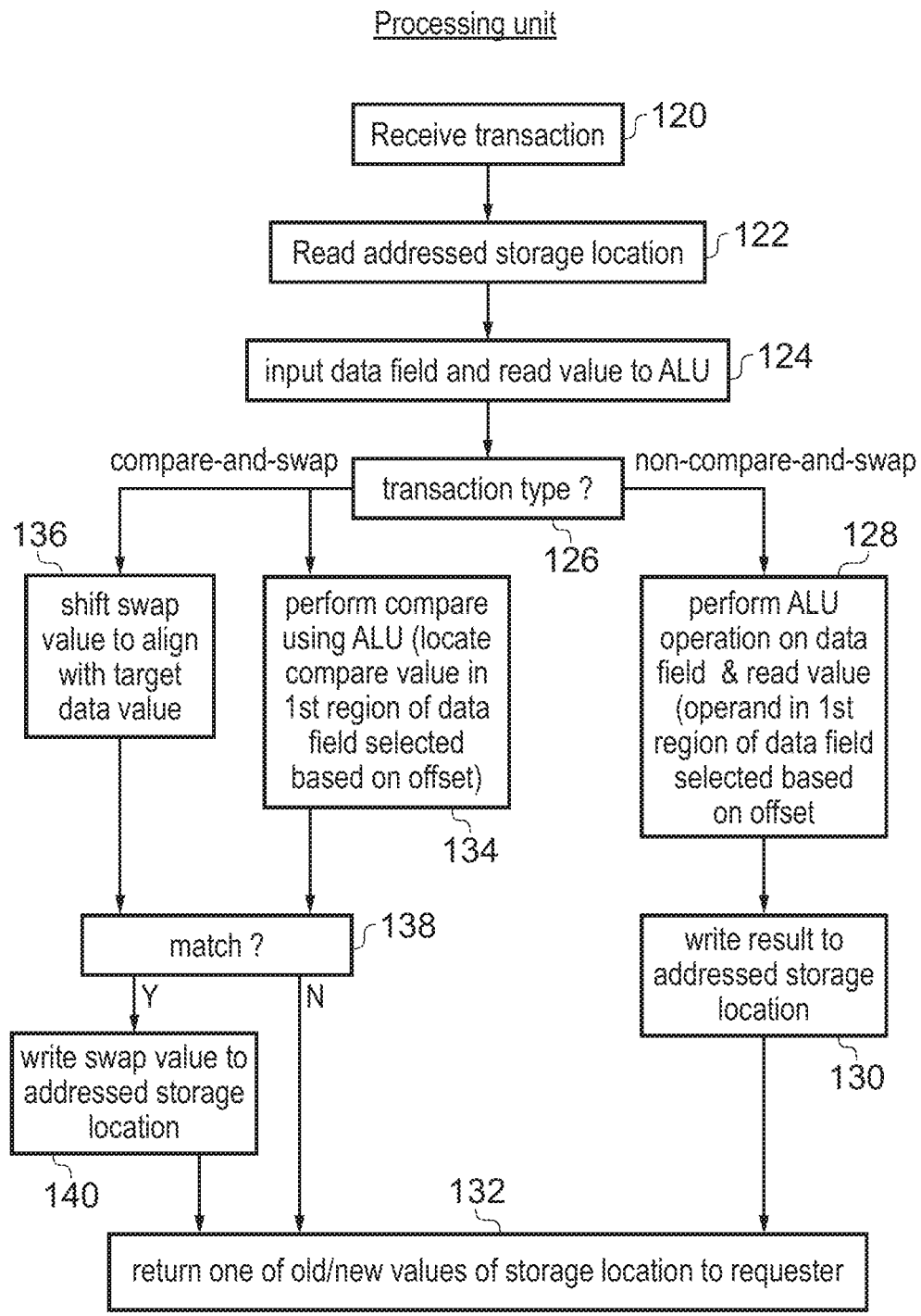
FIG. 11 is a flow diagram illustrating a method of processing an atomic transaction at a processing unit.

FIG. 11 shows a method of processing an atomic transaction at a processing unit 20. At step 120 an atomic transaction is received by transaction receiving circuitry (interface 36 in FIG. 2). At step 122 the storage location identified by the target address is read by the data access circuitry 32. At step 124 the unshifted version of the data field from the transaction and the cache line read from the memory 14 or cache 12 are supplied as input operands to the ALU 34. At step 126 the control circuitry 36 determines the type of transaction to be performed. If the transaction is a non-compare and swap transaction then at step 128 the ALU 34 performs an arithmetic operation on the data field and the read value, masking portions of the operands or the result which are outside the portion containing the required data and then at step 130 the result is written to the address storage location For an atomic swap operation the result of the ALU operation equals the operand transported in the data field, so is independent of the value read from the storage location (alternatively the ALU 34 could be bypassed). At step 132 either the old value in the read storage location or the new value generated by the ALU 34 is returned to the requester, depending on the type of transaction.

For compare-and-swap transactions, following step 126 at step 134 the ALU performs a compare operation to compare the data field and the value read from the cache or memory. The compare value is located within a first region of the data field which is selected based on the offset portion of the target address to align with the location of the target data value within the storage location. Hence, portions of the data field and the read cache line which do not contain the target values can be ignored during the comparison e.g. based on bit masking. Meanwhile, in parallel with the comparison, at step 136 the shifter 54 shifts the data field to align the swap value with the target data value. At step 138 it is determined based on the result of the ALU 34 whether there was a match between the compare value and the target data value, and if so then at step 140 the shifted swap value is written to the address storage location. Step 140 is omitted if the ALU detects a mismatch between the compare value and the target data value. At step 132, for the compare and swap transaction, the old value read from the storage location at step 122 is returned to the requester.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   a master device to issue a transactions specifying a target address and comprising a data field for transporting at least one operand value, wherein the master device is configured to issue a compare-and-swap transaction for which said at least one operand value comprises a compare data value and a swap data value; and
   a processing unit responsive to the compare-and-swap transaction to select whether to write the swap data value to a storage location corresponding to the target address in dependence on whether the compare data value matches a target data value read from the storage location, an offset portion of the target address indicating the position of the target data value within the storage location;
   wherein when issuing the compare-and-swap transaction, the master device is configured to pack the compare data value into a first region of said data field selected in dependence on said offset portion of the target address and having a position within said data field corresponding to the position of the target data value within the storage location.

2. The apparatus according to claim 1, wherein the master device is configured to pack the swap data value into a second region of said data field adjacent to said first region.

3. The apparatus according to claim 2, wherein the first region and the second region form a combined portion of the data field starting at an offset within said data field corresponding to a multiple of a size of said combined portion.

4. The apparatus according to claim 1, wherein when the target address is aligned with respect to a multiple of a combined size of said compare data value and said swap data value, the master device is configured to pack the swap data value into a second region following the first region in the data field; and when the target address is misaligned with respect to a multiple of said combined size, the master device is configured to pack the swap data value into a second region preceding the first region in the data field.

5. The apparatus according to claim 1, wherein the processing unit comprises an arithmetic logic unit to perform a compare operation on the compare data value extracted from the data field and the target data value read from the storage location.

6. The apparatus according to claim 5, wherein in the compare operation, the arithmetic logic unit is configured to receive as one of its input operands an unshifted version of the data field of the compare-and-swap transaction.

7. The apparatus according to claim 5, wherein the processing unit comprises a shifter to perform a shift operation to shift the data field to align the swap data value with the position of the target data value within the storage location.

8. The apparatus according to claim 7, wherein the shifter is configured to perform the shift operation in parallel with the arithmetic logic unit performing the compare operation.

9. The apparatus according to claim 1, wherein the master device is configured to issue at least one other type of transaction for which said data field comprises a single operand data value, and the processing unit is responsive to said at least one other type of transaction to update the storage location corresponding to the target address with a value dependent on at least said single operand data value;

wherein for said at least one other type of transaction, the master device is configured to pack said single operand data value into said first region of said data field.

10. The apparatus according to claim 9, wherein the processing unit comprises an arithmetic logic unit to generate a value to be written to the storage location in response to a given transaction, and a mapping between said data field of the given transaction and one of the inputs to the arithmetic logic unit is the same for both said compare-and-swap transaction and said at least one other type of transaction.

11. The apparatus according to claim 1, wherein said transactions comprising said data field comprises an atomic transactions for controlling the processing unit to perform an indivisibly observed set of operations.

12. The apparatus according to claim 1, comprising a plurality of master devices each configured to issue said transactions.

13. The apparatus according to claim 1, comprising an interconnect to maintain coherency between the master device and at least one other master device or cache, wherein the interconnect comprises the processing unit.

14. The apparatus according to claim 1, comprising a memory controller to control access to a memory, wherein the memory controller comprises the processing unit.

15. A master device comprising:

transaction issuing circuitry to issue a transactions specifying a target address and comprising a data field for transporting at least one operand value;

wherein the transaction issuing circuitry is configured to issue a compare-and-swap transaction for which said at least one operand value comprises a compare data value and a swap data value, the compare-and-swap transaction for controlling a processing unit to select whether to write the swap data value to a storage location corresponding to the target address in dependence on whether the compare data value matches a target data value read from the storage location, an offset portion of the target address indicating the position of the target data value within the storage location;

wherein when issuing the compare-and-swap transaction, the transaction issuing circuitry is configured to pack the compare data value into a first region of said data field selected in dependence on said offset portion of the target address and having a position within said data field corresponding to the position of the target data value within the storage location.

16. A processing unit comprising:

transaction receiving circuitry to receive a transactions specifying a target address and comprising a data field for transporting at least one operand value, wherein the transaction receiving circuitry is configured to receive a compare-and-swap transaction for which said at least one operand value comprises a compare data value and a swap data value;

data access circuitry responsive to the compare-and-swap transaction to read a storage location corresponding to the target address, an offset portion of the target address indicating the position of a target data value within the storage location; and processing circuitry responsive to the compare-and-swap transaction to select whether the data access circuitry is to write the swap data value to said storage location in dependence on whether the compare data value matches the target data value;

wherein the processing circuitry is configured to locate the compare data value within a first region of said data field selected in dependence on said offset portion of the target address and having a position within said data field corresponding to the position of the target data value within the storage location.

17. A data processing method comprising:

issuing a compare-and-swap transaction specifying a target address and comprising a data field for transporting a compare data value and a swap data value; and in response to the compare-and-swap transaction, selecting whether to write the swap data value to a storage location corresponding to the target address in dependence on whether the compare data value matches a target data value read from the storage location, an offset portion of the target address indicating the position of the target data value within the storage location;

wherein in the compare-and-swap transaction, the compare data value is packed into a first region of said data field selected in dependence on said offset portion of the target address and having a position within said data field corresponding to the position of the target data value within the storage location.

\* \* \* \* \*

UNITED STATES PATENT AND TRADEMARK OFFICE
CERTIFICATE OF CORRECTION

PATENT NO. : 10,223,002 B2
APPLICATION NO. : 15/427335
DATED : March 5, 2019
INVENTOR(S) : Mannava et al.

Page 1 of 1

It is certified that error appears in the above-identified patent and that said Letters Patent is hereby corrected as shown below:

In the Claims

Claim 1, Column 12, Line 51, "transactions" should read --transaction--.

Claim 11, Column 13, Line 58, "transactions" should read --transaction--.

Claim 12, Column 13, Line 63, "transactions" should read --transaction--.

Claim 15, Column 14, Line 6, "transactions" should read --transaction--.

Claim 16, Column 14, Line 31, "transactions" should read --transaction--.

Signed and Sealed this
Eighteenth Day of June, 2019

Andrei Iancu
*Director of the United States Patent and Trademark Office*